Figure 1:
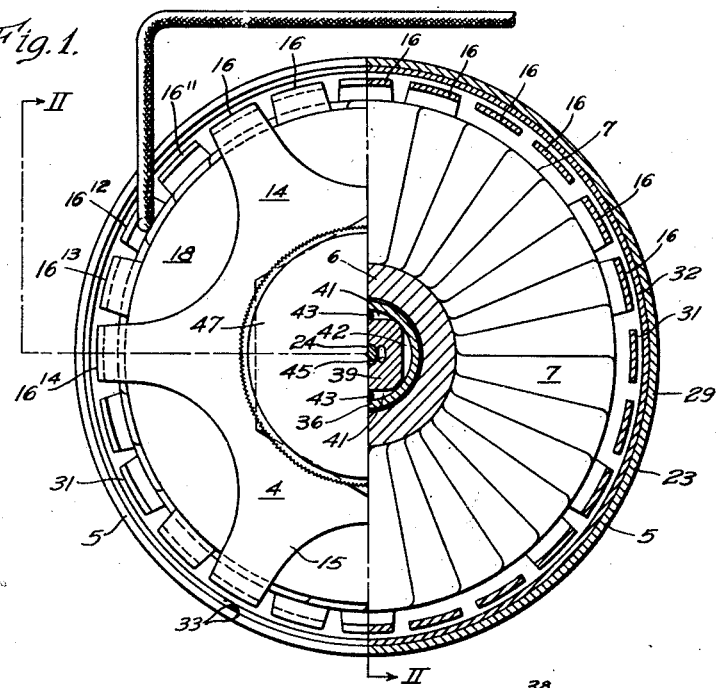

Dec. 13, 1938. B. E. LENEHAN 2,140,365
SMALL SYNCHRONOUS MOTOR
Filed Dec. 20, 1934 2 Sheets-Sheet 1

WITNESSES:

INVENTOR
Bernard E. Lenehan.
BY
ATTORNEY

Dec. 13, 1938.    B. E. LENEHAN    2,140,365
SMALL SYNCHRONOUS MOTOR
Filed Dec. 20, 1934    2 Sheets-Sheet 2

INVENTOR
*Bernard E. Lenehan.*
BY *O. B. Buchanan*
ATTORNEY

Patented Dec. 13, 1938

2,140,365

UNITED STATES PATENT OFFICE 2,140,365

SMALL SYNCHRONOUS MOTOR

Bernard E. Lenehan, Bloomfield, N. J., assignor to Westinghouse Electric & Manufacturing Company, East Pittsburgh, Pa., a corporation of Pennsylvania Application December 20, 1934, Serial No. 758,426

10 Claims. (Cl. 172—275)

This application relates in part to certain proportionings, in the hysteresis member of a small synchronous hysteresis motor, such as are shown, but not set forth as being new, in my Patent No. 1,961,975, patented June 5, 1934, and in part to a novel mounting-scheme for the hysteresis-element, and in part to a novel combined bearing and mounting means particularly adapted for a small motor of a certain type.

My invention relates to small synchronous motors, preferably of not exceeding a few watts power consumption, as for timing purposes, and it has particular relation to a hysteresis motor of this type, sometimes known as a remanence motor.

An object of my invention is to provide such a motor having the very minimum space requirements, so that it will fit easily in a demand meter register where the space is strictly limited.

A further object of my invention is to provide a hysteresis motor element in the form of a resilient strip of high-hysteresis iron or steel, which is frictionally held in place in or on a cylindrical supporting member, by its own resilience.

A further object of my invention is to provide a bent-strip hysteresis element whereby the unjoined ends of the strip provide a magnetic dissymmetry which prevents the occasional drifting of the rotor with respect to the rotating field, which has constituted a difficulty experienced with hysteresis motors which were not provided with some sort of magnetic dissymmetry.

A further object of my invention is to provide a hysteresis motor in which the hysteresis element has a certain optimum thickness, or approximately such a thickness, in order to obtain a high torque in a given space, or, conversely, to obtain a small size of motor for a given torque, as distinguished from previous hysteresis motors which have had a hysteresis element which is much too thick for the best results.

A further object of my invention is to provide an improved type of split-pole stator field element, which has been found to be highly desirable in this type of motor.

A still further object of my invention is to provide a new form of bearing element for a motor of the class described, involving such features as an annular enlarged lubricant-storing head, absorbent means in said enlarged lubricant-storing head whereby substantially all of the stored lubricant is held by said absorbent means, and detailed constructional features of such a bearing member.

Figure 2:
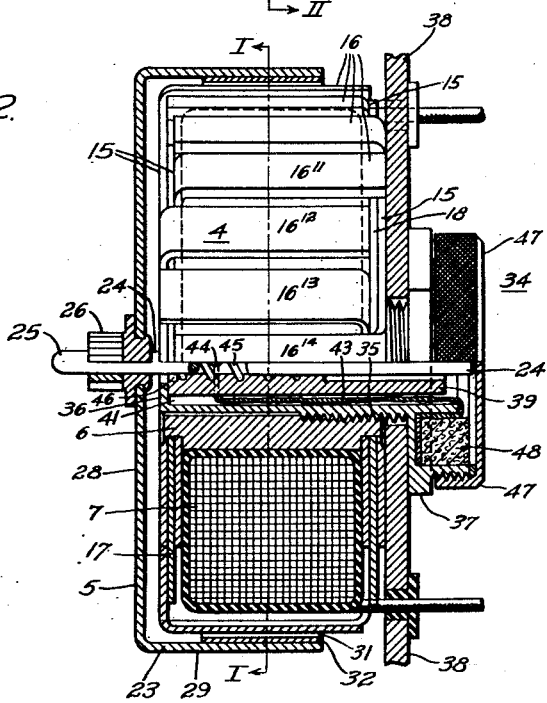
Figure 3:
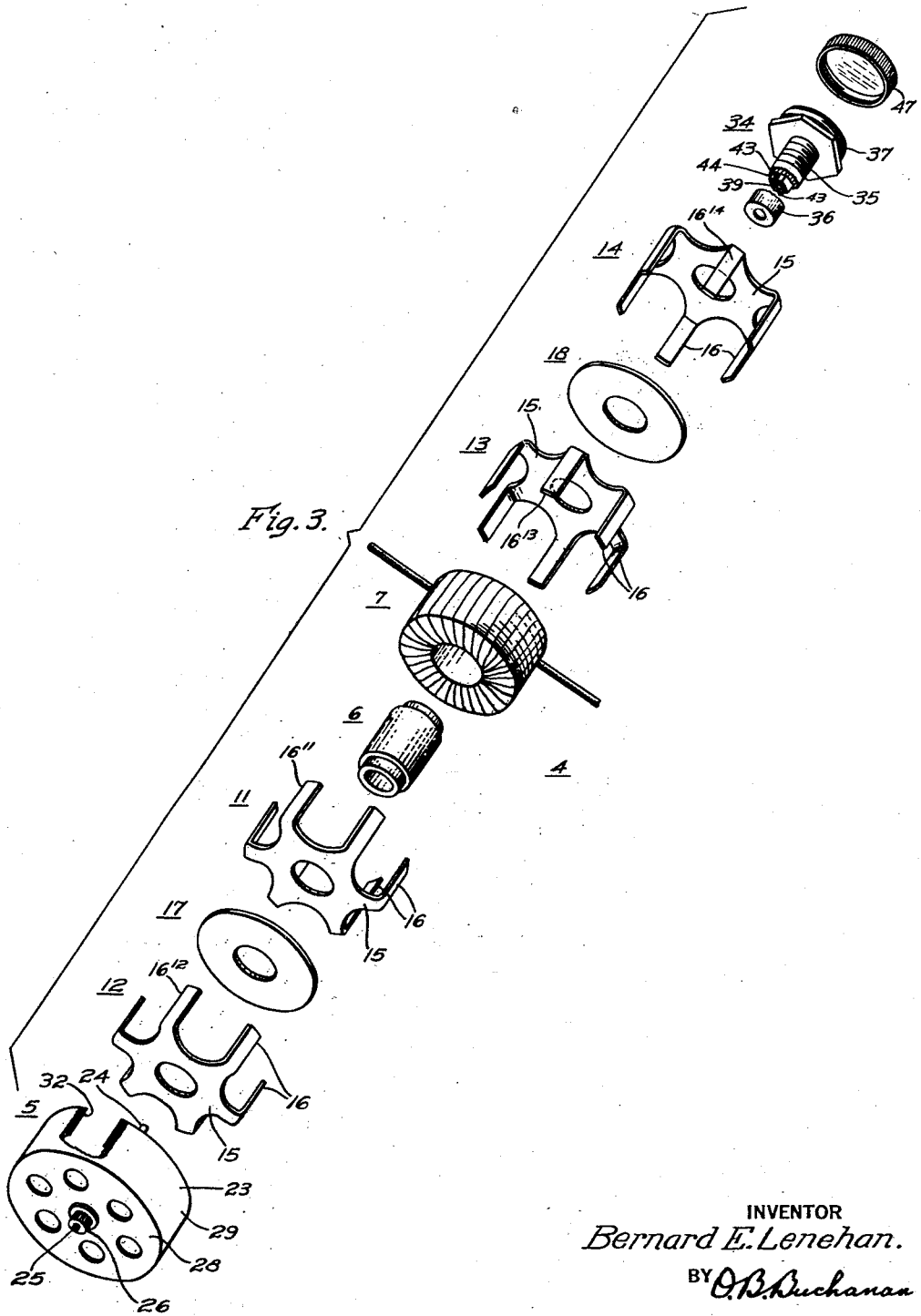

With the foregoing and other objects in view, my invention consists in the structures, combinations and methods hereinafter described and claimed and illustrated in the accompanying drawings, wherein Figure 1 is an enlarged rear plan view, one half being in section on the line I—I of Fig. 2, showing a motor in accordance with my invention, Fig. 2 is an enlarged vertical sectional view thereof with half of the stator element shown in elevation, and Fig. 3 is an exploded perspective view of the parts comprising the motor.

The drawings show one preferred form of embodiment of my invention wherein the motor comprises a stator field member 4 and a rotor member 5. The stator member comprises a hollow or tubular magnetizable core 6 surrounded by a single-phase coil or winding 7, said core 6 having magnetizable field-casing means at each end thereof. In the preferred form of construction which is shown in the drawings, the magnetizable field-casing means comprise four substantially identical field-casing sections 11, 12, 13 and 14 of magnetizable material, each field-casing section comprising a magnetizable disk 15 and a plurality of magnetizable teeth 16 forming pole pieces disposed at right angles to said disk.

Two of said magnetizable disks 15 are disposed at each end of the core, with copper or other lag disks 17 and 18, respectively, disposed therebetween, at the respective ends of the core 6; that is, the disks are arranged in the order 11, 17, 12 at one end of the core and in the order 13, 18, 14 at the other end of the core.

The magnetizable field-casing sections 11, 12, 13 and 14 are assembled with their teeth projecting inwardly over the coil 7, in a cylindrical multi-polar field formation around said coil, with the teeth progressing around the circumference in the order: (1) one tooth $16^{11}$ from the inner magnetizable field casing section 11 at one end of the core 6, (2) one tooth $16^{12}$ from the outer magnetizable field casing section 12 at the same end of the core 6, (3) one tooth $16^{13}$ from the inner magnetizable field casing section 13 at the other end of the core 6, (4) one tooth $16^{14}$ from the outer magnetizable field casing section 14 at said other end of the core 6, and so around the circumference of the cylinder.

The rotor member 5 comprises a light-weight cup-shaped supporting member 23 made of a material, such as aluminum, which develops substantially no hysteresis torque, said rotor cup member 23 being mounted upon a shaft 24. The rotor cup 23 is supported near one end of the shaft 24, with a short shaft-extension 25 therebeyond, which carries a pinion or other driving-arrangement 26 for transmitting its torque to the parts which are to be driven by the motor. The rotor cup 23 comprises a supporting disk-like portion or member 28 and a cylindrical portion or member 29 which is supported at one end from said disk-like portion or member 28, the cylindrical portion or member 29 projecting inwardly over the stator member in spaced relation thereto so as to be separated therefrom by an air-gap 31.

The torque-producing part of the rotor member 5 consists of a very thin strip of material of high hysteresis, in the form of a spring-steel strip 32, the thickness of which is necessarily shown very much exaggerated in the drawings. This is a single strip 32 of highly remanent material which must be put under strain in order to bend it completely around, in cylindrical formation, with its ends 33 touching or nearly touching each other, or in any other unattached relation to each other, in which condition the hysteresis strip 32 fits within the cylindrical portion 29 of the rotor cup member 23, and springs into place, thereafter frictionally holding itself, by its own resilience, against the inner or air-gap side of the cup member 23.

The stator member 4 is also provided with a bearing member 34 which is fastened, as by means of screw threads 35, within the hollow stator core 6.

The bearing member 34 comprises a tubular housing-part 36 which extends in said hollow core 6 and which has an annular lubricant-storing part comprising a hollow enlarged head 37, which forms an abutment for frictionally holding the bearing member 34 in place when it is screwed into the stator core member 6. Preferably, the bearing head 37 serves also as a means for securing the motor to a mounting-plate or support 38 (Fig. 2) which is perforated to receive the threaded tubular portion of the bearing housing 36, so that the mounting-plate 38 is clamped between the head 37 and the outer field-casing section 14 of the stator member of the motor.

The bearing member 34 is also provided with a separate journal-forming fitting 39, within said tubular housing-part 36. The fitting 39 is preferably provided with a plurality of external grooves or channels 41 and 42, which are preferably formed by making said fitting square, as shown in Fig. 1.

Two grooves 41 are utilized as lubricant-carrying channels which contain a wick 43 consisting of two or three fibers of wool yarn which extends from the annular lubricant-storing head 37, in the rear end of the bearing member, to a point 44 near the forward end of the bearing member, at which place the journal-forming fitting 39 is provided with an opening 44 whereby oil is fed to the shaft 24 at a point near the front of the bearing. The excess oil or lubricant is carried back by means of a spiral groove 45 on the inner surface of the journal-forming fitting 39, whereby the oil or lubricant is carried back to the annular reservoir or head 37.

The other grooves 42 between the journal-forming fitting 39 and the bearing housing 36 are utilized as air-vent grooves extending longitudinally between the journal-forming fitting 39 and the tubular housing part 36, and these air-vent grooves 42 are connected together at the front end by a transverse groove 46 which is milled in the front end of the journal-forming fitting 39 so as to connect the lubricant-storing space 37 at the back end of the bearing member with the atmospheric air, which reaches the front end of the bearing member, around the shaft 24. This venting is necessary in order to prevent oil from being forced out of the bearing as a result of thermal and barometric changes, because the rear end of the bearing is closed by a removable, air-tight closure 47, which can be removed for the purpose of replenishing the supply of lubricant, and which also serves as an end-thrust abutment for the shaft 24.

Preferably, the annular lubricant-storing space in the head 37 is filled by an annular body or washer 48 of wool batting or other absorbent means, whereby substantially all of the stored lubricant is held by said absorbent means.

In operation, when single-phase alternating current is supplied to the stator coil 7, the magnetizable field casing sections 11, 12, 13 and 14 are magnetized, the flux in the outer sections 12 and 14 lagging behind the flux in the inner sections 11 and 13, respectively, because of the action of the lag disks 17 and 18, respectively. The result is a rotating flux in the air-gap 31, said flux being similar to that which would be produced by a multi-polar polyphase field winding, having as many pairs of poles as there are teeth 16 on each of the field-casing sections 11, 12, 13 or 14. In the motor illustrated, each field-casing section has six teeth, so that the stator member is equivalent to a 12-pole stator, producing a rotating flux which makes 600 revolutions per minute on a 60-cycle supply.

The rotation of this stator field-flux drags around with it the iron hysteresis member 32 of the rotor member, forming a self-starting motor, operating on the hysteresis motor principle which is well known, slipping being safeguarded against by the magnetic dissymmetry produced by the abutting ends 33 of the hysteresis strip 32. One path of the flux may be traced as entering the rotor hysteresis member 32 at one of the twelve stator poles, crossing the air-gap 31 for this purpose: the flux then travels circumferentially through a sector of the "high hysteresis" strip 32 to the next stator pole, at which point it again crosses the air-gap 31 and returns to the stator element.

I have found that the problem of obtaining synchronous running, in a hysteresis motor, is mainly one of getting the right proportions. The rotor member must necessarily be operated from the rotating field of the stator, in series with an air-gap. It is possible to make the iron hysteresis member 32 of the rotor so thick that the greater part of the magnetomotive force of the stator is expended in driving the flux across the air-gap 31, thus giving a low flux-density in the rotor, resulting in low hysteresis losses and low torque. On the other hand, it is possible to make the iron rotor member 32 so thin that the magnetomotive force of the stator is mainly expended in the rotor iron 32, resulting in high hysteresis losses but little torque due to the small amount of material used. There is obviously a proportion, between these limits, giving maximum results.

With a given stator, the pole areas are fixed; and the air gap, the magnetomotive force, and the rotor iron area may be independently varied. Assuming that a certain flux-density will give the best results, or a maximum energy-loss in the rotor member due to hysteresis, the hysteresis-loss will be proportional to the volume of the rotor iron. The area of the rotor iron strip 32 will be proportional to the rotor flux per pole and the length will be proportional to the magnetomotive force required to force the flux circumferentially through a single pole pitch. Consequently, the volume of the rotor iron will be determined by the product of the flux and the magnetomotive force consumed therein. It is desirable, in order to obtain the best results, to use the rotor iron material at its point of maximum effectiveness. This point will be near the point of maximum permeability, since above that flux-density a large increase of magnetomotive force will produce small changes in flux. We may assume a practically constant permeability in this region; hence, the maximum product of flux and magnetomotive force in the iron will be reached when one-half the available magnetomotive force is lost in the rotor iron 32.

The length of a polar sector of the rotor iron will be one pole-pitch P, and its thickness, in a direction at right-angles to the air-gap, that is, measured radially, will be assumed to be T, with its width $w$, measured axially. The magnetomotive force needed for the iron will be $\Phi P/\mu Tw$, where $\Phi$ is the flux per sector, and $\mu$ is the permeability. The air-gap has an area $Pw/2$, with a length L, across which the flux goes twice. Its magnetomotive force is therefore $4\Phi L/Pw$. Making these two magnetomotive forces equal, $\Phi P/\mu Tw = 4\Phi L/Pw$, whence $T = P^2/4\mu L$. For high-carbon, glass-hard steel, $\mu =$ about 120, and $T = P^2/480$ L.

The particular motor shown in the drawings takes a power input of 1.1 watts at 115 volts and has an air-gap having a length L=.020 inch, a pole-pitch P=.35 inch, and a hysteresis-element thickness T=.012 inch, the foregoing values being only approximate, and being stated to give some idea or conception of the general order of magnitudes which are, or may be, involved. My hysteresis strip is much thinner than any hysteresis strip which has previously been utilized, so far as I am aware. In general, in a small hysteresis motor of not exceeding a few watts power consumption, the product TL will be less than one-thousandth of a square inch, or less than $P^2/100$.

In considering the development of torque within the rotor member, the aluminum cup-member 23 has been ignored. This is so, and it has been verified by experiment, because practically all of the rotor-flux is carried by the iron strip 32 which is interposed between the aluminum cup and the air-gap, so that very little flux reaches the aluminum. Any flux which should stray into the aluminum would be promptly repelled, during the starting period, by eddy currents in the aluminum; and during the normal running period at synchronous speed, the aluminum cup cannot generate any induction-motor torque, in any event, because there is no slip. The rotor cup 23 may be made, therefore, of any substantially non-magnetic material, whether conducting or non-conducting.

It will be noted that the shaft 24 of the rotor member 5 is inserted in the front end of the bearing member 34, and this shaft is pushed all the way through the journal-forming fitting 39 to the rear end of the bearing member, where the end of the shaft abuts against the inside of the removable closure 47, thus forming a thrust abutment which limits the axial movement of the shaft in that direction.

It will be noted further that the rotor member 5 consists of a cylindrical torque-producing portion 29, 32, which is supported, at the front end, from the disk-like member 28 which is secured to the shaft 24 at the front end of the bearing member 34, so that the center of gravity of the rotor member falls within the bearing member.

While I have shown my invention in a single preferred form of embodiment, it will be obvious that many changes and modifications may be made by those skilled in the art without losing some or all of the advantages and objects pointed out hereinabove. I desire, therefore, that the appended claims shall be accorded the broadest construction consistent with their language and the prior art.

I claim as my invention:

1. A hysteresis synchronous motor comprising a stator member and a rotor member with an annular air-gap therebetween, said stator member including alternating-current exciting means for setting up a magnetic field in said air-gap, and said rotor member including a cup-shaped supporting member made of material developing substantially no hysteresis torque and a resilient strip of hysteresis-torque-producing material bent into substantially circular formation and fitting snugly into place so as to be frictionally held, by its own resilience, against said cup-shaped supporting member, on the air-gap side thereof, the ends of said strip being unattached to each other.

2. A hysteresis motor comprising a field member, a hysteresis member rotatable relatively to said field member, with an air-gap therebetween, and an exciting means for said field member, characterized by such relative proportionings of the motor parts that T has a magnitude of the order of $P^2/4\mu L$, where T is the thickness of the hysteresis member in a direction at right angles to the air-gap, P is the pole-pitch distance between the centers of successive north and south poles of the field member, $\mu$ is the permeability of the hysteresis member, and L is the air-gap length.

3. A small hysteresis motor of not exceeding a few watts power consumption, comprising a field member, a hysteresis member rotatable relatively to said field member, with an air-gap therebetween, and an exciting means for said field member, characterized by such relative proportionings of the motor parts that TL is less than one thousandth of a square inch, where T is the thickness of the hysteresis member in a direction at right angles to the air-gap, and L is the air-gap length.

4. A hysteresis motor comprising a field member, a hysteresis member rotatable relatively to said field member, with an air-gap therebetween, and an exciting means for said field member, characterized by such relative proportionings of the motor parts that TL is less than $P^2/100$, where T is the thickness of the hysteresis member in a direction at right angles to the air-gap, P is the pole-pitch distance between the centers of successive north and south poles of the field member, and L is the air-gap length.

5. A small single-phase motor having a stator member and a rotor member; the stator member comprising a hollow magnetizable core, a coil surrounding said core, a bearing member within the hollow of said core, and a plurality of magnetizable flux-members, each comprising a magnetizable disk and a plurality of magnetizable teeth forming pole-pieces, at least some of said pole-pieces being disposed at right angles to their associated disk, all of said pole-pieces co-operating to provide a cylindrical multipolar field formation, at least one of said magnetizable disks being disposed at each end of the core; the rotor member being mounted on a shaft and having its torque-producing portion extending cylindrically from a supporting disk-like member at one end, the shaft being journalled in said bearing member, the center of gravity of said rotor member falling within said bearing member; said bearing member comprising, in addition to the shaft-journalling portion, a lubricant-storing part comprising a hollow, enlarged head on said bearing member, said enlarged lubricant-storing head being at the end of the motor opposite to the supporting disk-like member of the rotor member.

6. A small single-phase motor having a stator member and a rotor member; the stator member comprising a hollow magnetizable core, a coil surrounding said core, a bearing member within the hollow of said core, and a plurality of magnetizable flux-members, each comprising a magnetizable disk and a plurality of magnetizable teeth forming pole-pieces, at least some of said pole-pieces being disposed at right angles to their associated disk, all of said pole-pieces cooperating to provide a cylindrical multipolar field formation, at least one of said magnetizable disks being disposed at each end of the core; the rotor member being mounted on a shaft and having its torque-producing portion extending cylindrically from a supporting disk-like member at one end, the shaft being journalled in said bearing member, the center of gravity of said rotor member falling within said bearing member; said bearing member comprising, in addition to the shaft-journalling portion, a lubricant-storing part comprising a hollow, enlarged head on said bearing member, said enlarged lubricant-storing head being at the end of the motor opposite to the supporting disk-like member of the rotor member, and absorbent means in said enlarged lubricant-storing head whereby substantially all of the stored lubricant is held by said absorbent means.

7. A small single-phase motor having a stator member and a rotor member; the stator member comprising a hollow magnetizable core, a coil surrounding said core, a bearing member within the hollow of said core, and a plurality of magnetizable flux-members each comprising a magnetizable disk and a plurality of magnetizable teeth forming pole-pieces, at least some of said pole-pieces being disposed at right angles to their associated disk, all of said pole-pieces cooperating to provide a cylindrical multipolar field formation, at least one of said magnetizable disks being disposed at each end of the core; the rotor member being mounted on a shaft and having its torque-producing portion extending cylindrically from a supporting disk-like member at one end, the shaft being journalled in said bearing member, the center of gravity of said rotor member falling within said bearing member; said bearing member comprising, in addition to the shaft-journalling portion, an annular lubricant-storing part comprising a hollow, enlarged head on said bearing member, said enlarged lubricant-storing head being at the end of the motor opposite to the supporting disk-like member of the rotor member.

8. A small single-phase motor having a stator member and a rotor member; the stator member comprising a hollow magnetizable core, a coil surrounding said core, a bearing member within the hollow of said core, and a plurality of magnetizable flux-members each comprising a magnetizable disk and a plurality of magnetizable teeth forming pole-pieces, at least some of said pole-pieces being disposed at right angles to their associated disk, all of said pole-pieces cooperating to provide a cylindrical multipolar field formation, at least one of said magnetizable disks being disposed at each end of the core; the rotor member being mounted on a shaft and having its torque-producing portion extending cylindrically from a supporting disk-like member at one end, the shaft being journalled in said bearing member, the center of gravity of said rotor member falling within said bearing member; said bearing member comprising, in addition to the shaft-journalling portion, an annular lubricant-storing part comprising a hollow, enlarged head on said bearing member, said enlarged lubricant-storing head being at the end of the motor opposite to the supporting disk-like member of the rotor member, and annular absorbent means in said enlarged lubricant-storing head whereby substantially all of the stored lubricant is held by said absorbent means.

9. A small single-phase motor having a stator member and a rotor member; the stator member comprising a hollow magnetizable core, a coil surrounding said core, a bearing member within the hollow of said core and a plurality of magnetizable flux-members, each comprising a magnetizable disk and a plurality of magnetizable teeth forming pole-pieces, at least some of said pole-pieces being disposed at right angles to their associated disk, all of said pole-pieces cooperating to provide a cylindrical multipolar field formation; the rotor member being mounted on a shaft and having its torque-producing portion extending cylindrically from a supporting disk-like member at one end, the shaft being journalled in said bearing member, the center of gravity of said rotor member falling within said bearing member; said bearing member comprising a tubular housing-part extending in said hollow core and having an annular lubricant-storing part comprising a hollow enlarged head, said enlarged lubricant-storing head being at the end of the motor opposite to the supporting disk-like member of the rotor member, a separate journal-forming fitting within said hollow housing-part, and means for providing a lubricant-carrying channel extending longitudinally between said housing-part and said fitting, and from said annular lubricant-storing head to a point in the journal axially removed from said head.

10. A small single-phase motor having a stator member and a rotor member; the stator member comprising a hollow magnetizable core, a coil surrounding said core, a bearing member within the hollow of said core and a plurality of magnetizable flux-members, each comprising a magnetizable disk and a plurality of magnetizable teeth forming pole-pieces, at least some of said pole-pieces being disposed at right angles to their associated disk, all of said pole-pieces cooperating to provide a cylindrical multi-polar field formation; the rotor member being mounted on a shaft and having its torque-producing portion extending cylindrically from a supporting disk-like member at one end, the shaft being journalled in said bearing member, the center of gravity of said rotor member falling within said bearing member; said bearing member comprising a tubular housing-part extending in said hollow core and having an annular lubricant-storing part comprising a hollow enlarged head, said enlarged lubricant-storing head being at the end of the motor opposite to the supporting disk-like member of the rotor member, a separate journal-forming fitting within said hollow housing-part, means for providing a lubricant-carrying channel extending longitudinally between said housing-part and said fitting, and from said annular lubricant-storing head to a point in the journal axially removed from said head, a removable, air-tight closure for said head, annular absorbent means in said enlarged lubricant-storing head whereby substantially all of the stored lubricant is held by said absorbent means, a wick extending in said lubricant channel from said annular absorbent means to said axially removed point in the journal, and means for providing an air-venting channel extending longitudinally between said housing-part and said fitting, and from said closed head to the other end of the bearing.

BERNARD E. LENEHAN.